June 2, 1942.  G. S. ALLIN  2,284,790
WHEELED TRACK REPLACEMENT UNITS FOR TRACTORS
Filed Jan. 21, 1941  2 Sheets-Sheet 1
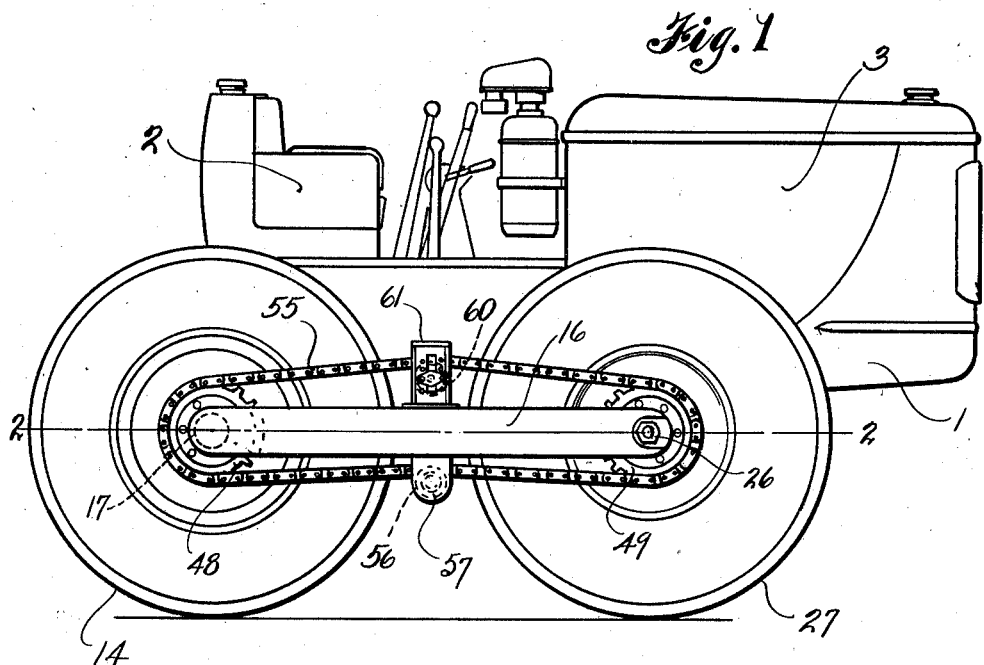
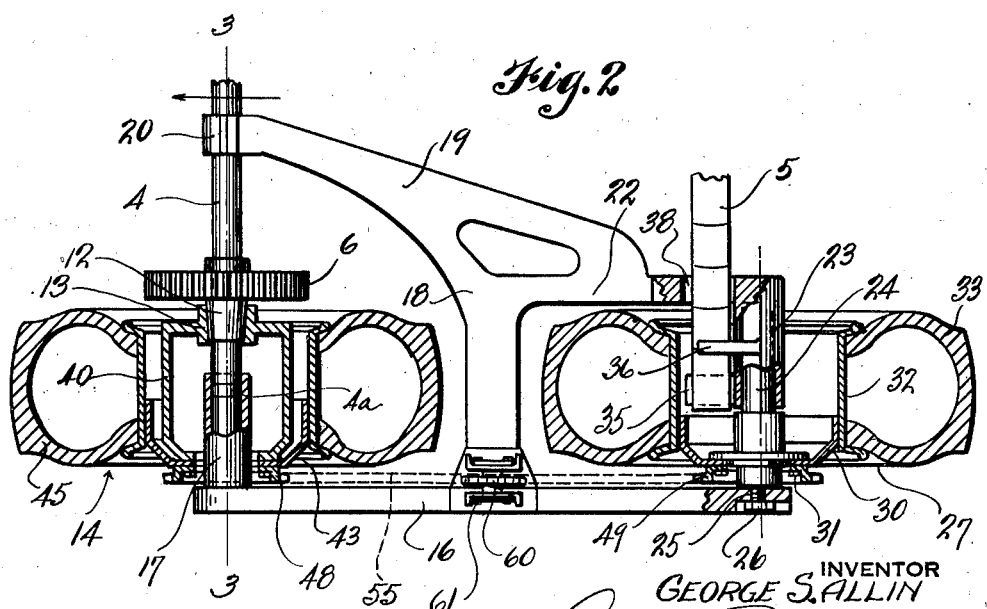
INVENTOR
GEORGE S. ALLIN
BY
Cook & Robinson
ATTORNEY June 2, 1942.   G. S. ALLIN   2,284,790
WHEELED TRACK REPLACEMENT UNITS FOR TRACTORS
Filed Jan. 21, 1941   2 Sheets-Sheet 2
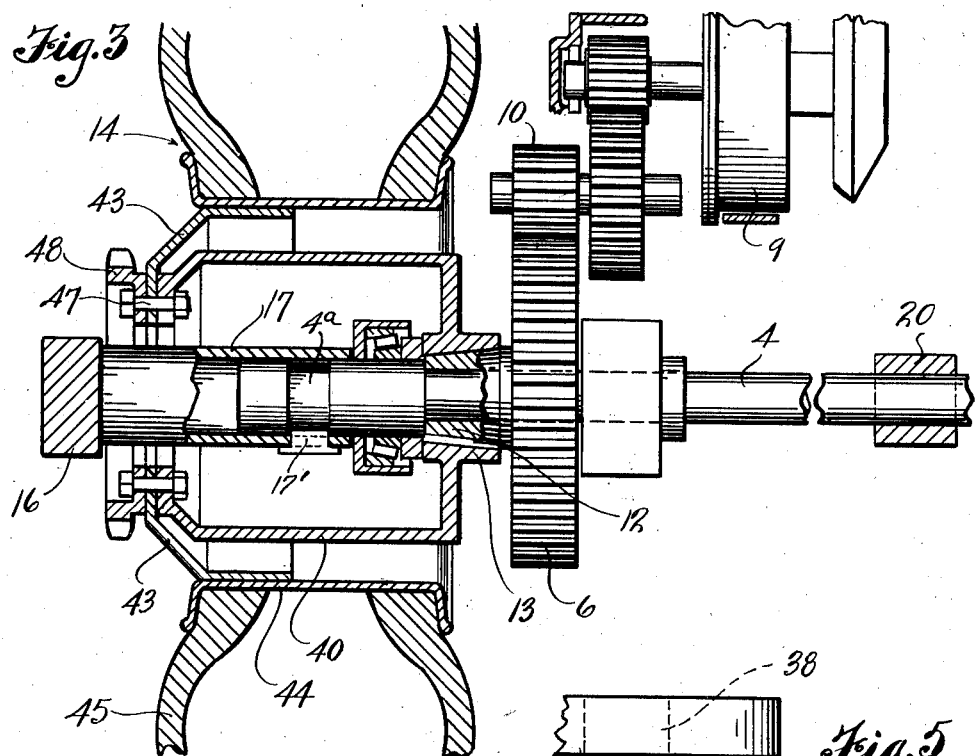
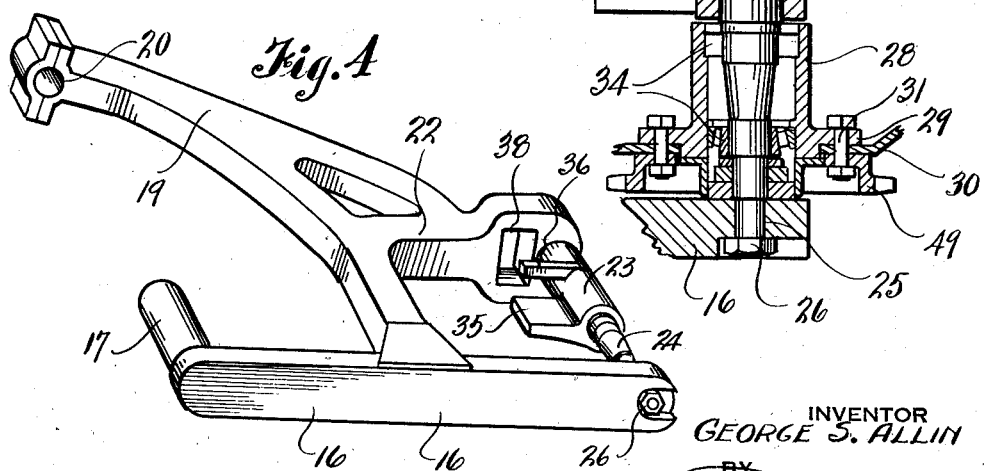
INVENTOR
GEORGE S. ALLIN
BY
Cook & Robinson
ATTORNEYS Patented June 2, 1942

2,284,790

UNITED STATES PATENT OFFICE 2,284,790

WHEELED TRACK REPLACEMENT UNIT FOR TRACTORS

George S. Allin, Seattle, Wash., assignor to Isaacson Iron Works, Seattle, Wash., a corporation of Washington Application January 21, 1941, Serial No. 375,279

7 Claims. (Cl. 180—17)

This invention relates to tractors, and has reference more particularly to wheel equipped units for replacement of the crawler tracks of a certain well known and extensively used present-day make of tractor.

In a copending application for patent, filed on May 28, 1940, under Serial No. 337,647, I have described and illustrated a type of track replacement unit for the conversion of certain makes of tractors of the crawler types to wheeled vehicles and have disclosed the steering of the tractor so equipped with the wheeled units, through the mediacy of the steering clutch devices for steering through the original crawler tracks and without addition of other means. The disclosures of the copending application, while sufficient for the basing of claims on the wheeled tractor that is thus provided, is, in fact, when considered in its specific design, a structure that is applicable only to tractors of certain make. In the present application, I have disclosed and described a track replacement unit that, in general, meets the conditions of that described in the pending application above mentioned, but which is designed especially for tractors of the crawler type sold under the trade-mark or name "Caterpillar," and which have some certain features of design found only in tractors of that particular make.

It is the principal object of the present invention to provide a wheel equipped track replacement unit for "Caterpillar" tractors, that may be easily and readily applied upon removal of the crawler tracks, or which may be applied as original equipment in lieu of the crawler tracks, to "Caterpillar" tractors, and without requiring any change or alteration in their parts as constructed for the reception of crawler tracks. Furthermore, it is an object of the invention to provide track replacement units which utilize large size, rubber-tired wheels, in tandem, at opposite sides of the tractor, for support, propulsion and steering, and wherein steering is effected through the driven wheels of the replacement units in the same manner and by the same means as originally designed for steering through the differential driving of crawler tracks.

Other objects of the invention are to be found in the details of construction and combination of parts, as used specifically in the construction of a track replacement unit for "Caterpillar" tractors, particularly in the design of the wheel mounting means whereby the balance and maneuverability of the tractor is retained without requiring any change or addition to the main body structure.

In accomplishing these and other objects of the invention, I have provided the improved details of construction, the preferred forms of which are illustrated in the accompanying drawings, wherein—

Fig. 1 is a side view of a "Caterpillar" tractor equipped with wheeled propulsion and steering units in accordance with the present invention.

Fig. 2 is an enlarged, horizontal sectional detail of one of the wheeled units as applied to the tractor, the section being on line 2—2 in Fig. 1.

Fig. 3 is an enlarged sectional detail as seen on line 3—3 in Fig. 2, showing the wheel driving gear train and clutch through which steering and propulsion is effected.

Fig. 4 is a perspective view of the swing frame which mounts the traction wheels.

Fig. 5 is a sectional detail showing the mounting spindle for the forward wheel and attachment of the driving sprocket to the wheel hub.

The "Caterpillar" tractor, like tractors of some other makes now in general use, has its main frame structure supported from the crawler track frames through the mediacy of a transverse pivot axle located toward the rear of the tractor, and a transverse equalizer spring forwardly thereof; the crawler track frames being located at opposite sides of the tractor, lengthwise thereof, with pivotal mounting at their rear ends on the end portions of the pivot axle extended at opposite sides of the main frame, and at their forward, oscillatory ends, are equipped for support thereon of the opposite ends of the equalizer spring. The crawler track frames are individually braced against outward or inward deflection by swing frame braces which have their forward ends attached to the track frames and their rearward ends mounted on the pivot axle approximately at the central line of the tractor frame.

Referring now more in detail to the present drawings—

In Fig. 1, I have designated the main frame structure of the tractor by numeral 1. This frame structure, among other parts, mounts the driver's seat, designated at 2, and the engine or prime mover, designated generally at 3. In Fig. 2, I have designated one end of the transverse pivot axle at 4 and an end of the transverse equalizer spring by numeral 5; it being understood that these parts extend in like manner to both sides of the tractor main frame. The pivot axle is fixed in, and extends through and beyond the opposite sides of the main frame for the oscillatory mounting of the track frames thereon, as is well understood in the art, and revolubly mounted on the opposite end portions of this axle are driven gear wheels 6 for driving the traction units. Without going into a detailed description of the driving gearing, it will be explained in brief that the gear wheels 6 are driven from the engine 3 through a transmission mechanism and then the gears 6 are individually and selectively controlled through the mediacy of clutches, as designated at 9 in Fig. 3, and a gear train which includes a pinion gear 10 in mesh with the corresponding gear wheel 6.

Without going into a detailed explanation of the means for or method of propelling and steering as now applied to the tracklaying "Caterpillar" tractors, suffice it to say that propulsion of the traction units at opposite sides of the main frame, is effected through the driving of the gear wheels 6, and steering is likewise through these gears and is effected by selectively holding or releasing the clutches 9 so that the traction unit at one side will be driven at a speed that is faster or slower than that of the track at the other side. It is herein provided that in the use of the present wheeled units, the steering and propulsion of the tractor will be effected in the same manner and through the same means as employed for the propulsion and steering through the crawler track equipment.

It is to be understood that the wheeled units for opposite sides of the tractor are alike in structure except as required in order that one be applied to the right side and the other to the left side. Therefore, while the description will be directed specifically only to the one unit illustrated, it is with the understanding that it would apply to both.

Referring now to the detailed showing of parts in Fig. 3, it will be observed that the driven gear wheel 6 which revolves on the end portion of pivot axle 4, has a conically tapered hub 12. When the machine is equipped with crawler tracks, this tapered hub mounts a track driving sprocket wheel thereon. However, in equipping the tractor with the present wheeled unit, the tapered hub 12 of gear wheel 6 is utilized as a mounting for the hub 13 of the rear wheel 14 of the present unit, which will later be described in detail.

Referring now to Fig. 2: The unit as there shown comprises wheels in tandem, one being mounted by axle 4 and the other by a swing frame structure that extends along the side of the tractor frame.

This swing frame consists of an outside, longitudinal beam 16 equipped at its rear end with an inwardly extending, tubular hub 17, revolubly fitted about and secured against outward displacement from the end portion of axle 4, by a key 17' mounted on the hub and engaging in a groove 4a of the shaft 4 as noted best in Fig. 3. Fixed to the beam 16, at a medial point, is a bracket or brace member 18, having an inwardly and rearwardly extending arm 19 provided at its end with a bearing 20 whereby it is pivotally secured to the pivot axle 4 near the medial line of the tractor. The bracket 18 also includes a forwardly directed horizontal arm 22, parallel with the forward end portion of the beam 16 and spaced inwardly therefrom and formed at its forward end with an outwardly extended bearing 23 in which a wheel spindle 24 is fixed. The spindle 24 is parallel with the pivot axle 4 and has its outer end portion shouldered and mounted in a hole 25 in the forward end of beam 16 and secured by a removable nut 26 threaded onto the spindle end.

Revolubly mounted on the spindle 24 and in tracking alinement with wheel 14, is a similar wheel 27. This wheel comprises a wheel hub 28 formed at its outer end with a flange 29 to which a wheel body disk 30 is fixed by bolts 31; the wheel body disk, in turn, mounting a wheel rim 32 on which a pneumatic tire 33 is mounted. The wheel hub is revolubly supported on the spindle through the mediacy of anti-friction bearings, as at 34, and is held in place by the nut 26.

By reference to Fig. 2, it will be observed that the body disk 30 is applied to the outer end of the cylindrical wheel rim 32 and that the rim opens inwardly toward the tractor and is unobstructed, due to the fact that the body disk is offset beyond the outer end of the rim. It will also be seen that, from the outer end portion of the bearing 23, a horizontal support 35 extends toward the rear wheel. This support is located substantially in the plane of the ground contact line of the wheel tire and serves as the means of support for the end of the equalizer spring 5 at that side of the tractor.

In order that the equalizer spring may be extended for support on this member 35, an opening, as at 38, is formed through the bracket arm 22 just rearward of the bearing 23. This opening is of sufficient size to clear the spring and permit oscillation of the frame freely and without binding.

Thus, the point of support of the tractor as effected through the end of the equalizer spring at this side of the vehicle, is located in the plane of the ground contact line and any tendency to inward or outward deflection of the frame that might be due to this application of weight is thereby avoided.

Preferably, a snubber bracket, as at 36, is extended from the bearing 23 to overlie the end of spring 5.

Referring again to wheel 14 mounted on the end portion of pivot axle 4, the wheel hub member 13 comprises a cylindrical body 40 equipped at its inner end with the tapered hub bearing 13 fitted and keyed to the tapered hub 12 of wheel 6. At its outer end, the cylindrical hub 40 is inwardly flanged and mounts a wheel body disk 43 by which a wheel rim 44 is mounted. The rim 44 mounts a pneumatic tire 45 of the size and character of tire 33. The body disk 43 is secured by bolts 47 to the inwardly flanged outer end portion of hub body 40, and these same bolts secure a sprocket ring gear 48 coaxially to the wheel. Likewise, a sprocket ring gear 49 is fixed to the forward wheel 27 by the bolts 31 which secure the wheel to hub flange 29. A chain belt 55 operates about the sprocket wheels so that the tandem wheels will turn in unison and the forward wheel will be driven from the rear wheel.

In order to eliminate chain belt slap or undue strain on quick stops or reverses, a guide roller 56, mounted by a bracket arm 57, supports the lower run of the chain belt from the beam 16 at a point between the wheels, and a tightener roller 60, adjustably mounted by the bracket 61 on the top side of beam 16, supports the top run of the belt. The roller 60 may be adjusted to maintain the desired tension on the chain belt.

With the parts so constructed and applied, it will be understood that the tandem sets of wheels at opposite sides of the tractor will be driven in unison either for propulsion or steering, and that the many advantages, inherent in use of large, pneumatic rubber tires, are thus made available in the tractor. Also, by so constructing the unit, it may be easily and readily applied to the "Caterpillar" tractor without necessitating any alteration therein as it already exists.

It has been found essential to easy steering and control, that the wheels be of substantial diameter and that they be as closely coupled as possible. The farther apart the wheels are placed, the more difficult becomes the steering in soft ground, but by keeping the wheels in the relative size and spacing shown, steering of the tractor is comparable to that of the crawler types and the maneuverability is greatly increased.

It is to be observed in this tractor that the wheel mounting frames are carried entirely by the pivot axle and are held in alinement without additional connection to or by guide rollers or linkage attached to or mounted by the main frame, as is usually the case. The spring 5 has no fixed connection with the bracket 35 or arm 22 that would serve to hold the swing frame against outward or inward deflection. This is taken care of through the connection 17 and arm 19.

Having thus described my invention, what I claim as new therein and desire to secure by Letters Patent is:

1. In a tractor of the character described, in combination, a transverse pivot axle fixed in the tractor frame and having an end portion thereof extended beyond a side of the tractor frame, a power transmission gear wheel revoluble on said axle, spaced from the end thereof and formed with an outwardly extending and tapering hub portion, a ground wheel revolubly mounted coaxial of the extended end portion of the pivot axle at the outside of said gear wheel and having a cylindrical hub portion formed at its inner end with a hub bearing fitted and keyed to the tapered hub of the said gear wheel and open at its outer end, and a swing frame comprising a longitudinal beam, extended forwardly of said ground wheel, at the outside thereof, and having a mounted portion at its rear end pivotally applied to the end portion of the pivot axle within the cylindrical wheel hub.

2. In a tractor of the character described, in combination, a transverse pivot axle fixed in the tractor frame and having an end portion thereof extended beyond a side of the tractor frame, a power transmission gear wheel revoluble on said axle, spaced from the end and formed with an outwardly extending and tapering hub portion, a ground wheel revolubly mounted coaxial of the extended end portion of the pivot axle at the outside of said gear wheel and having a cylindrical hub portion formed at its inner end with a hub bearing fitted and keyed to the tapered hub of the said gear wheel and open at its outer end, and a swing frame comprising a longitudinal beam, extended forwardly of said ground wheel, at the outside thereof, and having a mounted portion at its rear end pivotally applied to the end portion of the pivot axle within the cylindrical wheel hub, a spindle mounted by the swing frame at its forward end and a ground wheel on the spindle in tracking alinement with the first mentioned wheel, and a support for the tractor frame engaging the swing frame adjacent the place of mounting the spindle.

3. In a tractor of the character described, in combination, a transverse pivot axle fixed in the tractor frame and having an end portion extended beyond a side of the said tractor frame, a power transmission gear wheel revoluble on said axle at a location spaced from the end and formed with an outwardly extending, tapered hub portion, a ground wheel revolubly mounted coaxial of the pivot axle at the outside of said gear wheel and having a hollow cylindrical hub portion formed at its inner end with a hub bearing fitted to the extended hub of the said gear wheel to functionally mount the ground wheel, and open at its outer end, a swing frame comprising a longitudinal member extended along the side of the tractor frame and having a mounting portion at its rear end pivotally applied to the outer end portion of the pivot axle through the open outer end of the wheel hub, a wheel mounting spindle at the forward end of the swing frame, a ground wheel on the spindle in tracking alinement with the first mentioned wheel and having a hollow inwardly opening hub and a support for the tractor frame engaging with the spindle mounting within the said inwardly opening hub.

4. A swing frame for application to tractors of the character described; said swing frame comprising a longitudinal, outer beam equipped at its rear end with an inwardly extended hub for pivotal mounting on the end of the tractor pivot axle, an inner brace member fixed to the said outer beam at a medial point and having an inwardly and rearwardly extending leg adapted for pivotal mounting on the pivot axle, and having a forwardly directed leg spaced inwardly from the outer beam and formed at its forward end with an outwardly extended bearing, a bracket on the side of the said bearing, a wheel spindle mounted by said hub and having mounting at its outer end in the longitudinal beam, a ground wheel mounted on said spindle and having a hollow, inwardly opening cylindrical hub; and said forwardly directed leg having an opening therethrough for passage of the tractor equalizer spring for support on the said bracket.

5. In a tractor of the character described, having a transverse pivot axle with an end portion thereof extended beyond a side of the tractor, and a swing frame mounted by and extended forwardly from the pivot axle; a power transmission gear wheel revoluble on the axle within the extended end portion thereof, and having an outwardly extending hub portion, a ground wheel having a hub member of hollow form with a mounting at its inner end fitted about and locked with the extended hub portion of said gear wheel to mount said ground wheel coaxially of the pivot axle; said hub member being open at its outer end and said swing frame having a pivotal mounting on the extended end portion of the pivot axle through the open outer end of the said hub.

6. A swing frame for application to tractors of the character described, comprising a longitudinal outer beam equipped at its rear end for pivotal mounting on the end portion of the tractor pivot axle, and an inner brace member fixed to the longitudinal outer beam intermediate its ends, and having a part extended rearwardly and equipped for pivotal mounting on the tractor pivot axle and having a forwardly extended portion spaced inwardly from the outer beam, a bearing extended outwardly from the forward end thereof, a ground wheel mounting spindle extended from the bearing through the forward end portion of the outer beam and adapted for fixed connection therewith, a ground wheel revoluble on the spindle, and a spring mounting bracket on the bearing for supporting contact with the tractor equalizer spring.

7. A swing frame structure as recited in claim 6, wherein the forwardly extended portion of the inner member of the swing frame is formed with an opening therethrough for passage of the equalizer spring and said bracket is disposed on the bearing for the support of said equalizer spring after passing through the opening.

GEORGE S. ALLIN.